United States Patent
Tiwari

(10) Patent No.: US 8,583,116 B2
(45) Date of Patent: Nov. 12, 2013

(54) METHOD AND APPARATUS FOR COMMUNICATING NETWORK FEATURES DURING A ROUTING AREA UPDATE PROCEDURE

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/618,323

(22) Filed: Sep. 14, 2012

(65) Prior Publication Data

US 2013/0012152 A1 Jan. 10, 2013

Related U.S. Application Data

(62) Division of application No. 13/396,241, filed on Feb. 14, 2012.

(60) Provisional application No. 61/433,618, filed on Feb. 16, 2011.

(51) Int. Cl.
- *H04W 4/00* (2009.01)
- *H04W 36/00* (2009.01)
- *H04B 1/56* (2006.01)
- *H04L 5/14* (2006.01)

(52) U.S. Cl.
USPC ............. 455/435.1; 455/435.2; 455/435.3; 455/436; 455/437; 370/331; 370/252

(58) Field of Classification Search
USPC .................................................. 455/435.1
See application file for complete search history.

(56) References Cited

U.S. PATENT DOCUMENTS

2011/0103277 A1* 5/2011 Watfa et al. ............. 370/310

OTHER PUBLICATIONS

3GPP TS 24.008 V10.1.0 (3rd Generation Partnership Project; Technical Specification Group Core Network and Terminals; Mobile radio interface Layer 3 specification; Core network protocols; Stage 3 (Release 10); Published Dec. 2010).*

3GPP TS 33.102 V10.0.0 ( 3GPP; Technical Specification Group Services and System Aspects; 3G Security; Security architecture; Published Dec. 2010).*

* cited by examiner

*Primary Examiner* — Dwayne Bost
*Assistant Examiner* — Nalini Mummalaneni
(74) *Attorney, Agent, or Firm* — Perkins Coie LLP

(57) ABSTRACT

A method and system facilitates communicating network feature support between a mobile device and cellular network. The system protects network feature support information from tampering or spoofing during a periodic routing area update (RAU). In some cases, the network is prohibited from transmitting network feature support information in response to a periodic RAU. Instead, the mobile device may use previously provided network feature support information. In other cases, the network establishes integrity protection before transmitting network feature support information in response to a periodic RAU. The mobile device rejects responses that do not comply. If the mobile device rejects the response, it may also use previously provided network feature support information instead.

15 Claims, 9 Drawing Sheets

METHOD AND APPARATUS FOR COMMUNICATING NETWORK FEATURES DURING A ROUTING AREA UPDATE PROCEDURE

CROSS-REFERENCE TO RELATED APPLICATION(S)

This application is a divisional application and claims priority to U.S. patent application Ser. No. 13/396,241, filed Feb. 14, 2012 and titled METHOD AND APPARATUS FOR COMMUNICATING NETWORK FEATURES DURING A ROUTING AREA UPDATE PROCEDURE which claims benefit of priority of U.S. Provisional Application No. 61/443,618, filed on Feb. 16, 2011 and titled METHOD TO COMMUNICATE NETWORK FEATURE DURING THE ROUTING AREA UPDATE PROCEDURE, which is incorporated herein by reference in its entirety.

BACKGROUND

Cellular network consists of multiple base stations, each of which has a coverage area. Mobile devices, such as cellular phones, smart phones, tablets, and portable computers, wirelessly connect to these base stations to receive services such as data and voice connectivity. Base stations are connected together and to other networks through the core network. Previously, core network standards supported circuit-switched connections for voice calls. However, in recent years, service providers added packet-switched features to the core network as these packet-based features became more popular in the wireless interface between the mobile device and the base station. These packet-switched features allow networks to support voice communications through Voice over Internet Protocol ("VoIP") (e.g., through an application running on a portable computer). However, these new features are not supported by every service provider. As a result, standards organizations have added messaging to allow cellular networks to advertise their features to mobile devices that are connected to the cellular network. These new features, and the associated information sharing, have added additional complexity to the interactions between mobile devices and the cellular network.

DETAILED DESCRIPTION

A method and system for communicating network feature support between a mobile device and cellular network is disclosed (hereinafter the "feature support system" or the "system"). The feature support system operates in a cellular network that supports packet-based communications within the core network. During certain operations, such as during a routing area update, the cellular network transmits network feature support information to mobile devices. The network feature support information includes flags indicating whether the network supports particular features, such as voice over packet-switched connections and emergency calls over packet-switched connections. If the network does not transmit the network feature support information, the mobile device uses default settings, which specify that the features are not supported. As a result, during a routing area update ("RAU"), a malicious third party could prevent a mobile device from using certain features by replying to the update with a message that omits the network feature support information.

During operation, the mobile device must perform a RAU to notify the cellular network of its routing area. This may be done when the mobile device moves to a new routing area or if a specified time period passes without the mobile device performing a RAU (a "periodic RAU"). The feature support system modifies the handling of periodic RAUs to protect against the risk discussed above. In some embodiments, the network is prohibited from sending the network feature support information in response to a periodic RAU. The mobile device can then reject a response that includes the network feature support information. Instead, the mobile device uses network feature support information that was previously provided, such as during an initial attach process.

In other embodiments, the network is required to use an integrity protection procedure to insure that the response message cannot be tampered with or spoofed. During operation, when the network receives a periodic RAU request, it determines whether it is required to send the network feature support information (i.e., because it supports some of the features in the network feature support information). If so, the network establishes integrity protection with the mobile device before it sends a response. The mobile device is configured to reject a message with network feature support information that is not sent using integrity protection. In some embodiments, the mobile device uses previously provided network feature support information instead.

Figure 1:
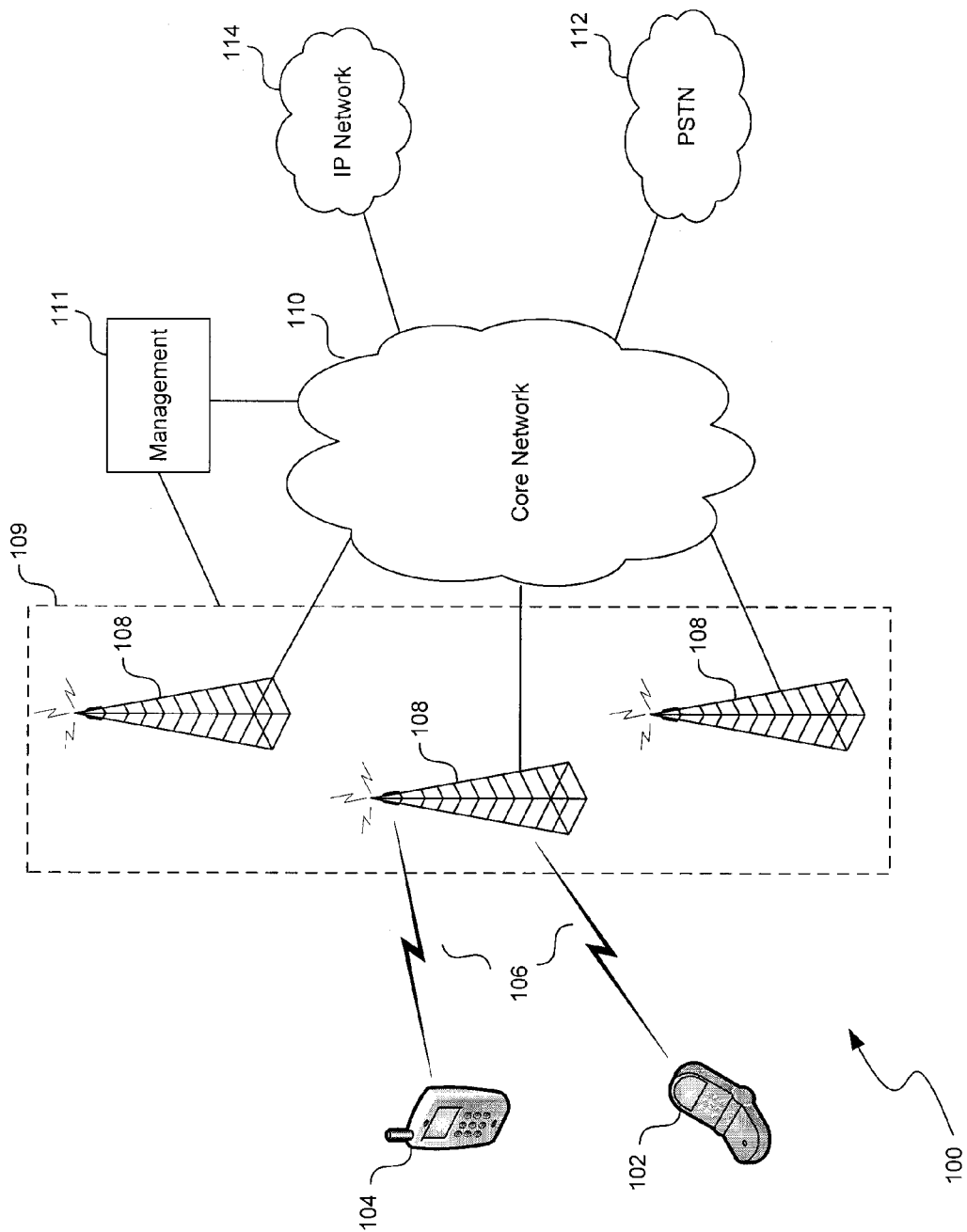
FIG. 1 is a network diagram of a representative environment in which a feature support system operates.

FIG. 1 is a network diagram of a representative environment 100 in which the feature support system operates. Mobile devices 102 and 104 roam in an area covered by a radio access network ("RAN") 109, such as UTRAN or EUTRAN. The mobile devices 102 and 104 are, for example, located in the environment 100 shown in FIG. 1. The mobile devices 102 and 104 communicate to a base station 108 through a wireless connection 106. The wireless connection 106 could be implemented using any system for transmitting digital data. For example, the connection could use a cellular network implementing Global System for Mobile Communications ("GSM"), Universal Mobile Telephone Services ("UMTS"), Long-Term Evolution ("LTE"), or CDMA2000 or a non-cellular network implementing WiFi (IEEE 802.11) or Bluetooth.

In some implementations, network responsibilities are divided between the base stations 108, which handle direct communications with the mobile devices 102 and 104, and management components, which manage resource allocation to the mobile devices. In a GSM network, the base stations 108 correspond to Base Transceiver Stations (BTSs), while the management components correspond to Base Station Controllers (BSCs). A similar division exists under other standards, such as UMTS and LTE. The management components are shown in FIG. 1 as a management component 111, which is connected to the RAN 109 and a core network 110. The management component 111 allocates resources to the mobile devices 102 and 104 and provides network feature support information that the mobile devices 102 and 104 may use to select services to attach to.

In the environment 100 of FIG. 1, the core network 110 is at least partially implemented according to the IP Multimedia Subsystem ("IMS") framework defined by the 3rd Generation Partnership Project ("3GPP"). Core networks implementing IMS use packet-based mechanisms for transmitting data and voice within the core network. In particular, voice connections are initiated using Session Initiation Protocol ("SIP") and use VoIP mechanisms for transmitting voice data through the packet-based network.

The core network 110 is connected to a Public-Switched Telephone Network ("PSTN") 112, which provides a connection between the mobile devices 102 and 104 and remote telephones on another network. When a user of one of the mobile devices 102 and 104 makes a voice telephone call, the base station 108 routes the call through the core network 110 to the PSTN 112. The PSTN 112 then automatically connects the call to a remote telephone. If the remote telephone is another mobile device, the call is routed through a second radio access network's backhaul to another cellular transceiver.

The base station 108 is also connected through the core network 110 to an IP network 114, which provides a packet-based connection to remote devices supporting network applications. When the user of one of the mobile devices 102 or 104 communicates through a data connection, the base station 108 routes the packet data through the core network 110 to the IP network 114. The IP network 114 connects the core network 110 to remote devices, such as e-mail servers, web servers, and any other application generally available over IP networks such as the Internet.

Figure 2:
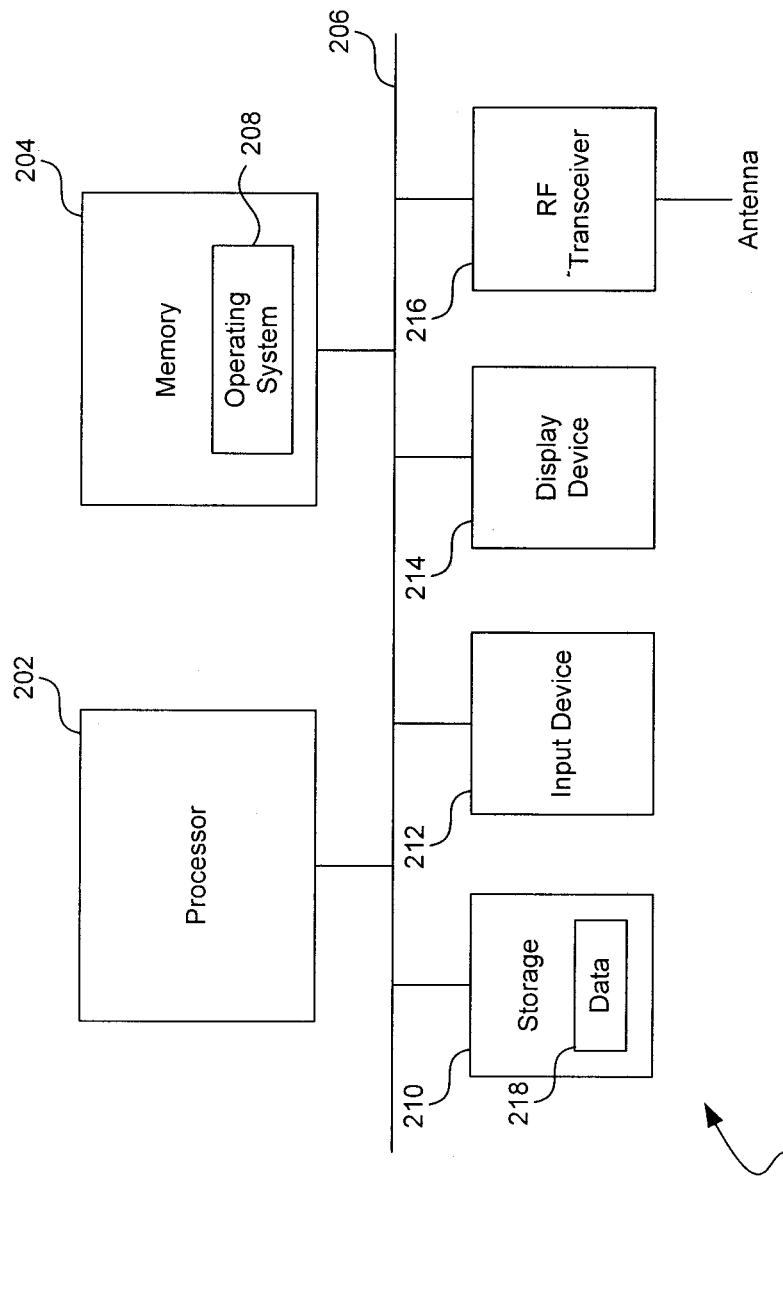
FIG. 2 is a high-level block diagram showing an example of the architecture of a device.

FIG. 2 is a high-level block diagram showing an example of the architecture of a device 200. The device 200 may represent the mobile devices 102 and 104 of FIG. 1. The device 200 comprises one or more processors 202 and a memory 204 coupled to an interconnect 206. The interconnect 206 shown in FIG. 2 is an abstraction that represents any one or more separate physical buses, one or more point-to-point connections, or both buses and point-to-point connections connected by appropriate bridges, adapters, or controllers. The interconnect 206, therefore, may comprise, for example, a system bus, a Peripheral Component Interconnect (PCI) family bus, a HyperTransport or industry standard architecture (ISA) bus, a small computer system interface (SCSI) bus, a universal serial bus (USB), a IIC (I2C) bus, or an Institute of Electrical and Electronics Engineers (IEEE) standard 1394 bus, sometimes referred to as "Firewire."

The processor(s) 202 may comprise central processing units (CPUs) of the device 200 and, thus, control the overall operation of the device 200. In certain examples, the processor(s) 202 accomplish this by executing software or firmware stored in the memory 204. The processor(s) 202 may be, or may comprise, one or more programmable general purpose or special purpose microprocessors, digital signal processors (DSPs), programmable controllers, application-specific integrated circuits (ASICs), programmable logic devices (PLDs), or the like, or a combination of such devices.

The memory 204 is, or comprises, the main memory of the device 200. The memory 204 represents any form of fixed or removable random access memory (RAM), read-only memory (ROM), flash memory, or the like, or a combination of such devices. In use, the memory 204 stores, among other things, an operating system 208 of the device 200.

The device 200 comprises an input device 212, which enables a user to control the device. The input device 212 may comprise a keyboard, trackpad, touch sensitive screen, or other standard computer input device. The device 200 also comprises a display device 214 suitable for displaying a user interface. The device 200 further comprises a radio frequency ("RE") transceiver 216 that provides the device 200 with the ability to communicate with remote devices over a network and may be, for example, a wireless adapter. The device 200 may further comprise local storage 210 coupled to the interconnect 206. The local storage 210 may comprise, for example, a flash memory device that is configured to provide mass storage and that stores data 218 used by the mobile device.

One skilled in the art will appreciate that a similar configuration may be used to implement the management component 111. In such an implementation, some modules, such as the input device 212 and the RF transceiver 216 may be omitted or replaced with similar components, such as a wired network connection.

During operation, the network must track the location of the mobile devices 102 and 104 to ensure that it can send paging messages to notify the mobile device of incoming calls. The network must be able to do so even when the mobile devices 102 and 104 are operating in a low power mode and not in active contact with the network. In practice, modern cellular networks track location using "routing areas," which are sets of base stations that are grouped together to allow for consolidated signaling. When the network needs to send a paging message to a particular mobile device, it identifies the routing area for the mobile device and sends the paging message through all of the base stations in the mobile device's routing area. Because of this, each mobile device must keep the network informed of its current routing area.

Current standards, such as 3GPP TS 24.008, specify an update procedure (referred to as a "standard" RAU) that the mobile device performs when it moves from a base station in one routing area to a base station in another routing area. To keep routing area information from growing stale, the standards also require that mobile devices update their routing area periodically even if they do not move to a new routing area. This allows the network to stop routing messages to mobile devices that have not updated for a long time. Otherwise, the network may waste resources sending paging messages to a mobile device that has been turned off. This process is referred to as a "periodic" RAU.

Figure 3:
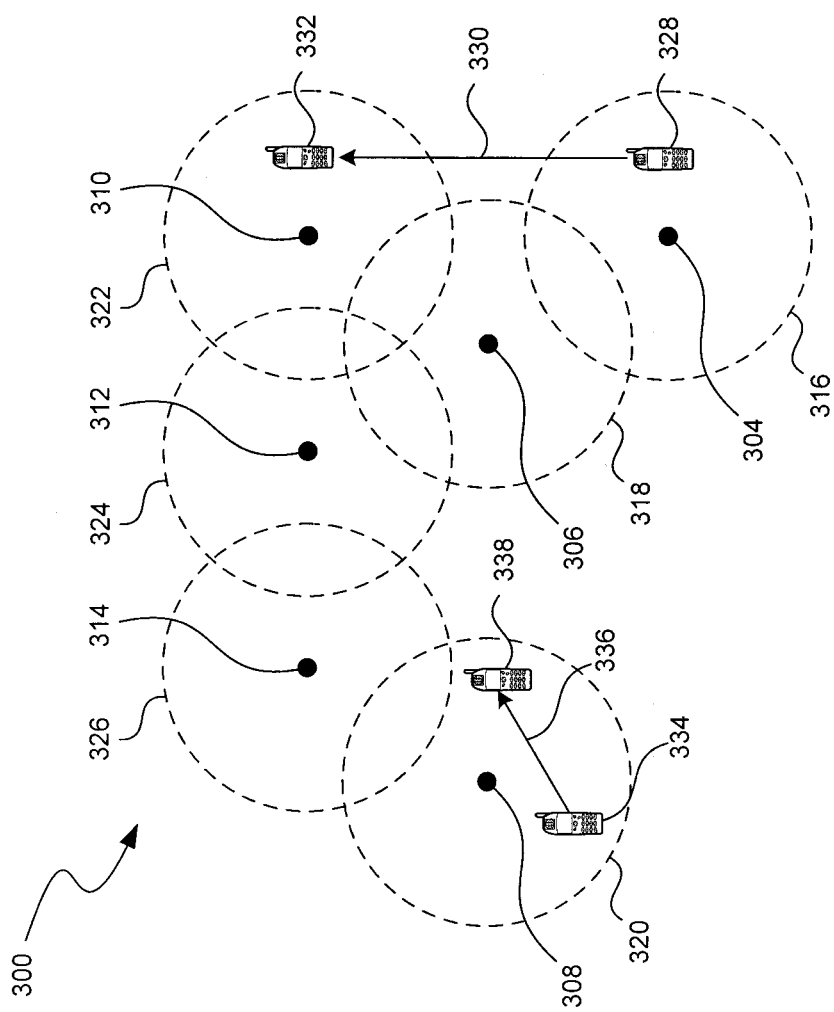
FIG. 3 illustrates an exemplary environment in which a mobile device moves within the coverage area of a cellular network.

FIG. 3 illustrates an exemplary environment in which a mobile device moves within the coverage area of a cellular network 300. As shown in FIG. 3, the cellular network 300 includes multiple base stations 304, 306, 308, 310, 312, and 314. Each of the base stations has a corresponding coverage area 316, 318, 320, 322, 324, and 326, respectively. The cellular network 300 is defined by the combination of these coverage areas. The cellular network 300 is also divided into a first routing area, including base stations 304 and 306, and a second routing area, including base stations 308, 310, 312, and 314. A first mobile device 328 is initially in the coverage area 316 of base station 304, which is in the first routing area.

During operation, the first mobile device 328 moves along a path 330 to point 332, which is in a new coverage area 322 associated with base station 310. The movement also moves the mobile device 328 from the first routing area to the second routing area. Accordingly, the mobile device 328 must initiate a standard RAU to notify the network of its move to the new routing area.

In contrast, the second mobile device 334 moves along a path 336, which is entirely within the coverage area 320 of base station 308. Thus, unlike mobile device 328, the mobile device 334 does not move to a new routing area. Instead, the mobile device 334 maintains a periodic RAU timer that triggers when a specified time period has passed. If the mobile device 334 has not performed a standard RAU before the periodic RAU timer expires, it must perform a periodic RAU at that time. In some embodiments, the specified time period is set at manufacture time and does not change, regardless of which network the mobile device is connected to. In other embodiments, the network may specify the predetermined time period in a configuration message.

Figure 4:
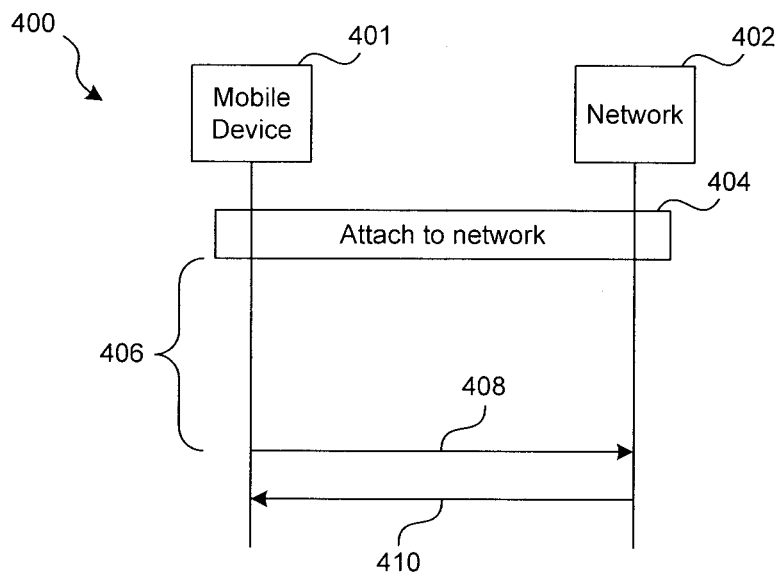
FIG. 4 is an exemplary timing diagram of a message exchange between a mobile device and a cellular network for controlling the routing area update procedure.

FIG. 4 is an exemplary timing diagram of a message exchange 400 between a mobile device 401 and a cellular network 402 for controlling the RAU procedure. The message exchange 400 illustrates the message processing for a periodic RAU. Although the network 402 is shown as a single entity, one skilled in the art will appreciate that the network 402 may consist of multiple distinct nodes, each of which may handle a portion of the functionality. For example, the network 402 may consist of a BTS, which communicates wirelessly with the mobile device 401 but allows a higher level component, such as the management component 111 of FIG. 1, to manage the configuration of and resource allocation for the mobile device 401.

The message exchange 400 begins with a message exchange 404 in order to attach the mobile device 401 to one or more services provided by the network 402. The message exchange 404 includes the messaging necessary for the mobile device 401 to initially attach to particular services, such as GPRS data services. During this process, the network 402 may provide the mobile device 401 with a temporary mobile subscriber identity (TMSI), which the mobile device 401 will use to identify itself while operating in a particular routing area. The network may also provide other information, such as network feature support information, indicating whether the network 402 supports the particular features. This messaging is discussed in greater detail below with reference to FIG. 5. Notably, however, the network 402 may use the message exchange 404 to inform the mobile device whether the core network supports particular functions, such as emergency calls over packet-switched connections.

After the mobile device 401 has completed the attach process through the message exchange 404, a time period 406, corresponding to the specified time period for a periodic RAU, passes. During the time period 406, the mobile device 401 may exchange various messages with the network 402; however, these messages are unrelated to the RAU procedure and are not shown. After the time period 406 has passed, the mobile device 401 determines that it needs to perform a periodic RAU. The mobile device 401 then transmits a RAU request message 408. The RAU request message 408 includes protocol information, such as message type, device identity, identification of the old routing area (which is the same as the current routing area in a periodic update), and a flag indicating the type of update (i.e., standard or periodic).

The network 402 then responds with a RAU accept message 410, which indicates that the network 402 has successfully received and processed the request message from the mobile device 401. The RAU accept message 410 may include various information, such as the identification of the current routing area, a new value for the specified time period 406, and other information discussed below. The mobile device 401 stores the information received in the RAU accept message 410 and may continue operating in communication with the network 402. Although not shown in FIG. 4, the message exchange 400 may also include a RAU complete message, which the mobile device 401 may send to indicate that certain processing required by the RAU accept message 410 has been completed. This final message is typically required only for a limited number of cases, such as a change in the mobile device's TMSI.

Figure 5:
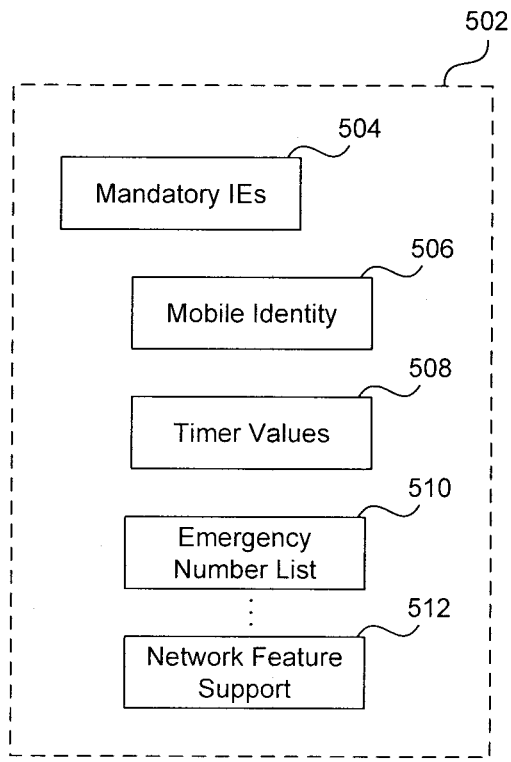
FIG. 5 is an exemplary layout of a routing area update accept message.

FIG. 5 is an exemplary layout of a RAU accept message 502. As shown in FIG. 5, the message 502 includes a set of mandatory information elements ("IEs") 504, which may include a message identifier, a routing area identifier, and a timer value. The message 502 may also include one or more optional IEs. For example, the message 502 may include a mobile identity IE 506 that assigns a new TMSI to the mobile device. The message 502 may also include one or more timer value IEs 508 that update the values of particular timers used by the mobile device (e.g., the periodic RAU timer). The message 502 also may include an emergency number list IE 510 that encodes emergency numbers for use when operating on the cellular network.

The message 502 may also include a network feature support IE 512 that includes a set of flags indicating whether the core network supports various communication features. The network feature support IE 512 was introduced in December 2007 in 3GPP TS 24.008 v. 8.0.0 and initially included flags indicating support for Multimedia Broadcast/Multicast Service (MBMS) mode and Location Services/Mobile-Initiated Location Request (LCS-MOLR) over packet-switched connections. In September 2009, 3GPP TS 24.008 v. 8.7.0 added a flag indicating whether the core network supports IMS voice services over packet-switched connections (i.e., VoIP). In 3GPP TS 24.008 v. 9.0.0 (also September 2009), a flag indicating support for emergency calls using packet-switched connections was also added. These flags are maintained separately because many countries have regulations on what types of connections may be used for emergency calls. In addition, the message 502 may also include various other IEs that are not shown in FIG. 5.

The 3GPP standards provide for default handling when particular IEs are not present in the message 502. In particular, when the network does not transmit the network feature support IE 512, the mobile device simply assumes that none of the features are supported. Thus, under current standards, a network that supports any of the features must always include the network feature support IE 512. However, this design creates a risk that a malicious third party could deny the mobile device access to certain features by sending an otherwise correct RAU accept message without the network feature support IE 512. Under current 3GPP standards, the mobile device would have no way of determining that the malicious accept message had improperly omitted the network feature support IE 512. As a result, the mobile device would be unable to make IMS voice calls and emergency calls over packet-switched connections. This is a particular problem for devices that must use packet-switched connections to make voice calls, such as personal computers that must use VoIP.

The feature support system provides various means for preventing this type of malicious action. In some embodiments, the network is prohibited from sending the network feature support IE in RAU accept messages that were sent in response to a periodic RAU. In these embodiments, the mobile device may instead use previously provided network feature support information, such as values from a network feature support IE sent during the initial attach process. This configuration allows the network to transmit the network feature support IE only when the supported features have changed. It further removes the default configuration that could result in the mobile device being denied access to particular features of the network.

In other embodiments, the network is still required to send the network feature support IE to notify the mobile device of the particular features such as voice over IP and the emergency calls over IP. However, the network must then use integrity protection when it transmits the network feature support IE. Integrity protection provides a mechanism that can be used to determine whether data has been altered in an unauthorized way ("tampering") or sent by an unauthorized sender ("spoofing"). By requiring that the network use integrity protection for RAU accept messages containing the network feature support IE, the system prevents a malicious third party from modifying the accept message or pretending to be the network denying the mobile device access to the network features. If the network is not required to send the network feature support IE, it does not have to use integrity protection for the accept message.

Integrity protection may include any method known in the art that allows a transmitter to encode messages so that a receiver can detect modifications or unauthorized transmitters. In particular, 3GPP TS 33.102 describes an integrity protection procedure suitable for use in modern cellular networks. Under this procedure, the mobile device and the network agree on an encryption key and an algorithm to use for integrity protection. When the network needs to send an integrity-protected message, it generates a message authentication code by applying the agreed-upon algorithm to the message, the encryption key, and other inputs to generate a message authentication code. The network then appends the message authentication code to the message before transmitting it. To verify the integrity of the message, the mobile device calculates the message authentication code by applying the agreed algorithm to at least part of the received message, the encryption key, and other inputs. The mobile device then compares the calculated code to the authentication code appended to the message. If the codes match, the mobile device considers the message to be verified. Integrity protection imposes costs in terms of processing time and additional message traffic. Because of these costs, integrity protection is only used selectively to protect certain types of messages. In particular, integrity protection is generally used when a mobile device registers with the cellular network or attaches to particular services.

Figure 6:
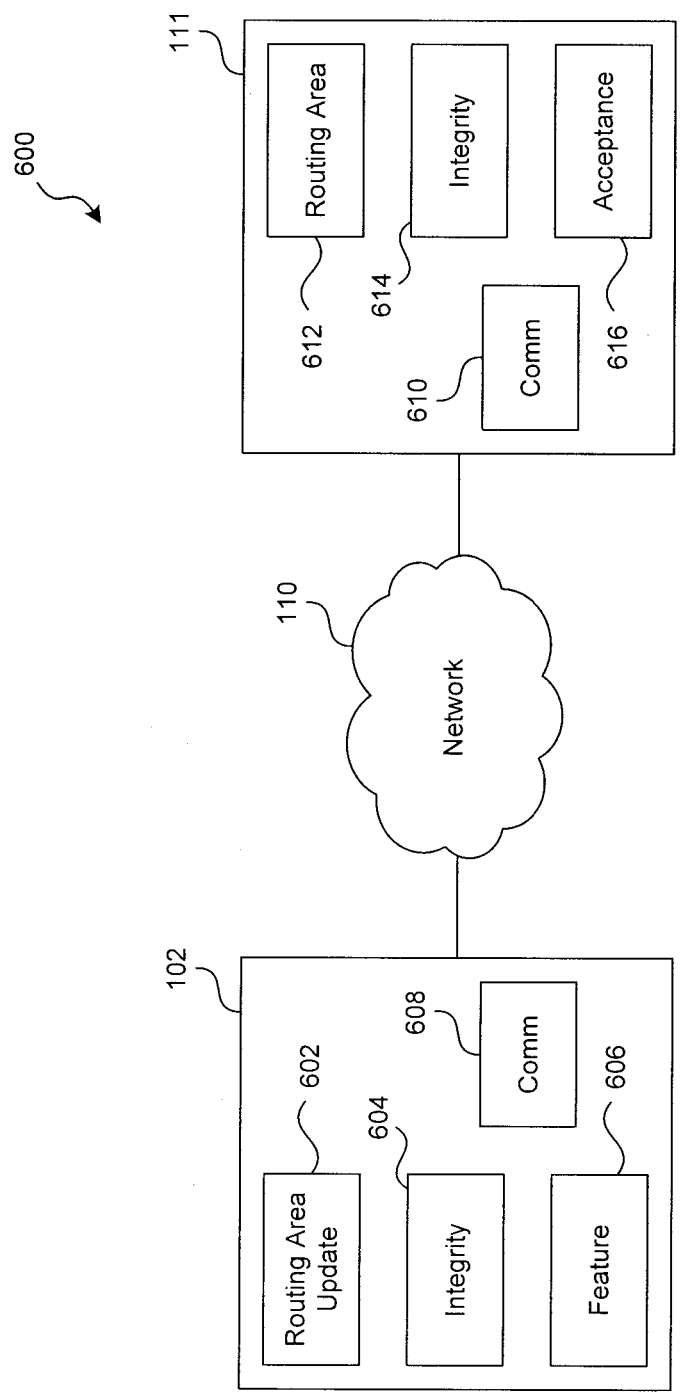
FIG. 6 is a logical block diagram of individual components of the environment of FIG. 1.

FIG. 6 is a logical block diagram of individual components of the environment 100 of FIG. 1. In particular, FIG. 6 illustrates an exemplary mobile device 102, the network 110, and the management component 111. Although not shown in FIG. 6, the mobile device 102 communicates with the network 110 through the RAN 109 of FIG. 1.

Aspects of the components shown in FIG. 6 may be implemented as special purpose hardware circuitry, programmable circuitry, or a combination of these. As will be discussed in additional detail herein, the mobile device 102 and the management component 111 comprise a number of modules to facilitate the functions of the system. The modules and their underlying code and/or data may be implemented in a single physical device or distributed over multiple physical devices and the functionality implemented by calls to remote services. Similarly, code could be stored in local storage or remote storage and distributed in one or more physical devices. Assuming a programmable implementation, the code to support the functionality of this system may be stored on a computer-readable medium such as an optical drive, flash memory, or a hard drive. One skilled in the art will appreciate that some of these individual modules may be implemented using application-specific integrated circuits (ASICs), programmable logic devices (PLDs), or a general-purpose processor configured with software and/or firmware.

As shown in FIG. 6, the mobile device 102 includes a routing area update component 602 that is configured to determine when the mobile device 102 should initiate a RAU. In particular, the routing area update component 602 initiates a RAU when it detects that the mobile device 102 has moved to a new routing area. The routing area update component 602 also maintains a periodic RAU timer to detect when the specified time period for performing a periodic RAU has passed. Each time a RAU is performed, the routing area update component 602 resets the periodic RAU timer. The mobile device 102 also includes an integrity component 604 that is configured to communicate with the management component 111 to enable integrity protection according to the methods discussed above. The mobile device 102 also includes a feature component 606 that is configured to extract network feature support information from the RAU accept message and store the information in local storage on the mobile device 102. The mobile device 102 also includes a communication component 608 that is configured to communicate through the network 110 to transmit RAU messages to the management component 111.

The management component 111 includes a similar set of components for executing the corresponding functionality at the network. In particular, the management component 111 includes a communication component 610 that is configured to communicate through the network 110 to the communication component 608 on the mobile device 102. The communication link between the communication component 608 and the communication component 610 generally includes both wireless and wired connections.

The management component 111 also includes a routing area component 612 which is configured handle the RAU for the network. In particular, the routing area component 612 receives the RAU request message from the mobile device 102 and directs an acceptance component 616 to send a RAU accept message. As discussed below, the routing area component 612 determines whether the RAU is a standard or periodic update and responds according to one of the embodiments discussed above. In some embodiments, the routing area component 612 simply communicates with the acceptance component 616 to determine the contents of the RAU accept message. The acceptance component 616 uses information from the routing area component 612, as well as other network management information, to generate the RAU accept message. In other embodiments, the routing area component 612 may also direct an integrity component 614 to set up integrity protection between the mobile device 102 and the management component 111.

Figure 7A:
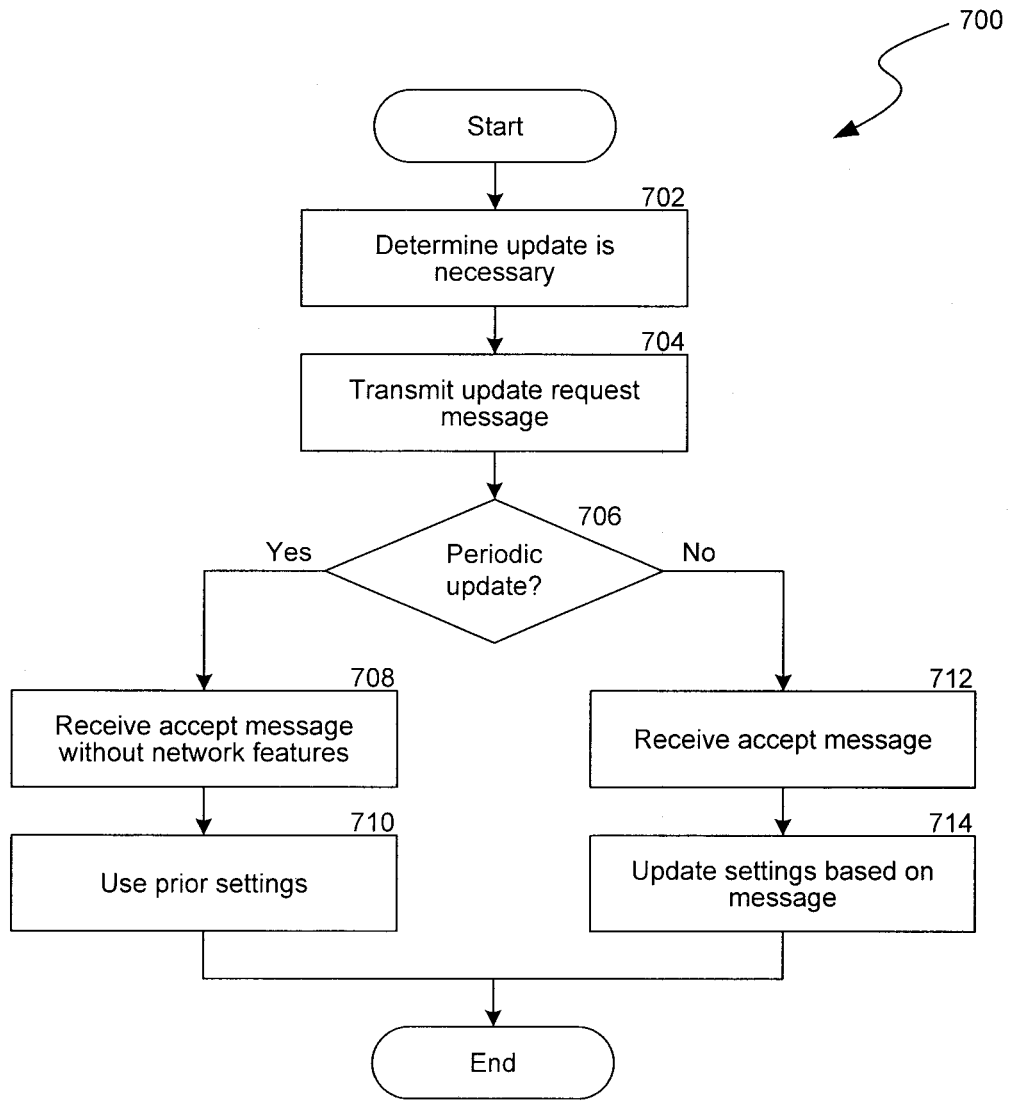
FIG. 7A is a flowchart of a process for executing a first embodiment of the feature support system by the mobile device.

FIG. 7A is a flowchart of a process 700 for executing a first embodiment of the feature support system by the mobile device. Processing begins at block 702, where the mobile device determines that a RAU is necessary. As discussed above, a RAU is necessary when the mobile device moves to a base station that is within a different routing area or when the periodic RAU timer expires. Processing then proceeds to block 704, where the mobile device transmits a RAU request message to the network. The RAU request message generally includes data specifying the type of update, the mobile device's identity, and other relevant information. Processing then proceeds to decision block 706, where the process 700 branches depending on whether the RAU was a periodic update.

In the embodiment of FIG. 7A, the network is prohibited from sending a RAU accept message with the network feature support IE when the RAU is a periodic update. Accordingly, if the update is a periodic update, the system proceeds to block 708, where the mobile device receives a RAU accept message that does not include a network feature support IE. In this embodiment, a RAU accept message that includes the network feature support IE will be rejected as invalid. Processing then proceeds to block 710, where the mobile device uses the previously provided settings for network feature support. As discussed above, the settings may have been provided when the mobile device initially attached to particular data services.

However, if the RAU is a standard RAU, processing proceeds to block 712, where the system receives a RAU accept message from the network. The RAU accept message may or may not include a network feature support IE, depending on the characteristics of the new routing area. Processing then proceeds to block 714, where the mobile device updates its settings based on the information in the RAU accept message. If the RAU accept message does not include a network feature support IE, the mobile device updates its settings based on the default values for these settings. Typically, the mobile device defaults to assuming that none of the features are supported. After the settings are determined, the process 700 ends.

Figure 7B:
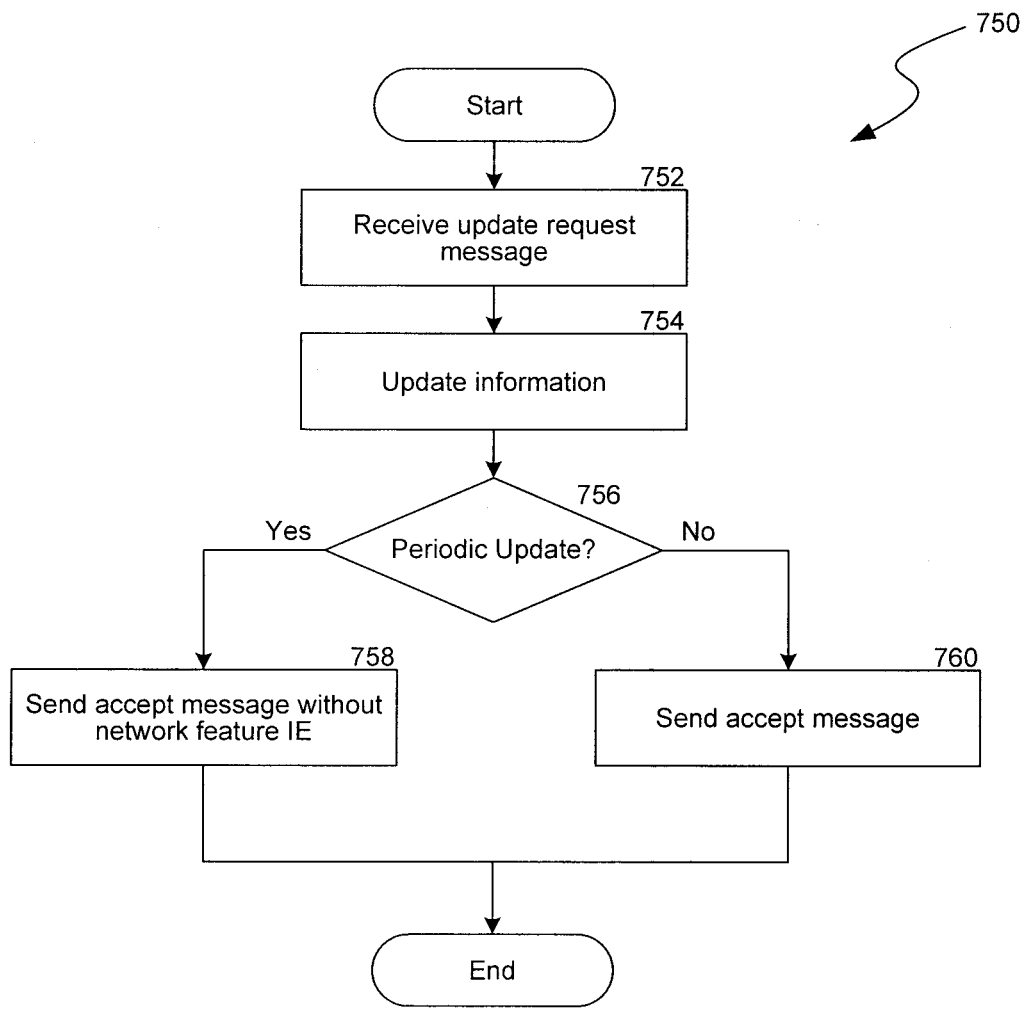
FIG. 7B is a flowchart of a process for executing the first embodiment of the feature support system by the network.

FIG. 7B is a flowchart of a process 750 for executing the first embodiment of the feature support system by the network. Processing begins at block 752, where the network receives a RAU request message from the mobile device. Processing then proceeds to block 754, where the network updates its stored information about the mobile device based on the received message. This step may include, for example, storing information about a new routing area for the mobile device.

Processing then proceeds to decision block 756, where the network determines whether the RAU request message corresponds to a periodic RAU. The network generally determines this by checking a flag in the RAU request message that indicates the type of update being performed. If the network determines that the RAU request message corresponds to a periodic RAU, processing proceeds to block 758, where the system sends an accept message that omits the network feature support IE, even if it would ordinarily be sent. The accept message may include other IEs corresponding to other information from the network to the mobile device, such as an IE indicating a change in the mobile device's TMSI; however, in the embodiment of FIG. 7B, the network is prohibited from including the network features IE in response to a periodic RAU request message.

If the RAU request message does not correspond to a periodic update, processing proceeds to block 760, where the network sends a accept message to the mobile device according to the standard process for responding to a RAU request message. In particular, if the network features available in the new routing area differ from the default values, the network sends an updated network feature support IE in block 760. If the default values are correct, the network may simply omit the network feature support IE. After the network sends the RAU accept message to the mobile device, the process 750 ends.

Figure 8A:
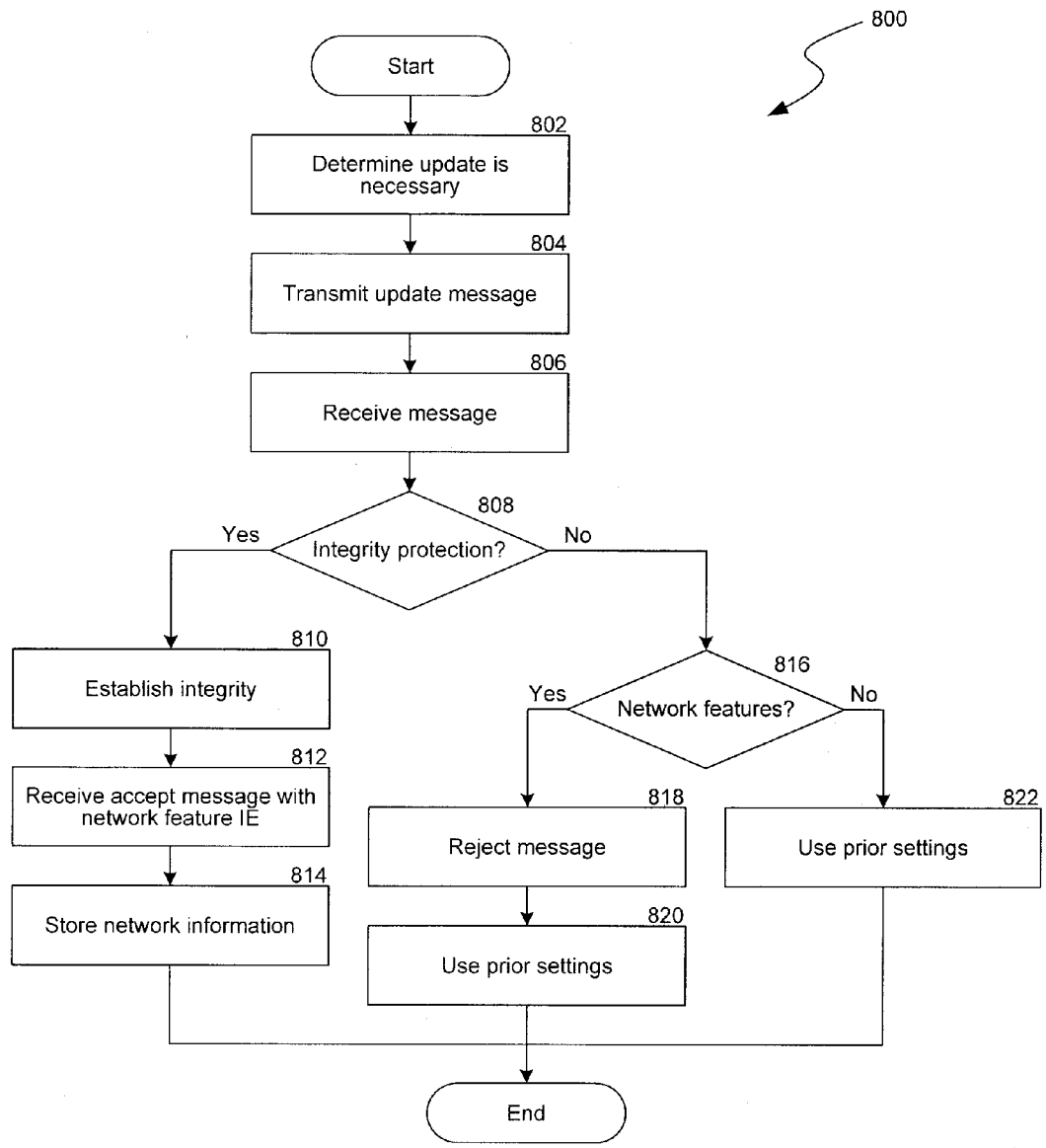
FIG. 8A is a flowchart of a process for executing a second embodiment of the feature support system by the mobile device.

FIG. 8A is a flowchart of a process 800 for executing a second embodiment of the feature support system by the mobile device. For clarity, the flowchart of FIG. 8A does not describe the handling for a standard RAU; the processing for standard updates is the same as described above with reference to FIG. 7A. Processing begins at block 802, where the mobile device determines that a RAU is necessary. Processing then proceeds to block 804, where the mobile device transmits the RAU request message to the network. The processing of blocks 802 and 804 is substantially the same as the corresponding blocks in the process 700 of FIG. 7A. Processing then proceeds to block 806, where the mobile device receives a message in response to the RAU request.

As discussed above, in the second embodiment, the network is required to use an integrity protection process if it transmits the network feature support IE for a periodic RAU. Accordingly, processing then proceeds to decision block 808, where the system determines whether the received message is initiating an integrity protection process. If so, processing proceeds to block 810, where the mobile device establishes integrity protection with the network. The details of this process were discussed previously. In some embodiments, some or all of the messages used to establish integrity protection are exchanged prior to the RAU, such as during the initial attach process. Processing then proceeds to block 812, where the mobile device receives an integrity-protected RAU accept message that includes a network feature support IE. Processing then proceeds to block 814, where the mobile device extracts the relevant settings from the network feature support IE and stores the information locally. After the settings are stored locally, the mobile device may perform operations based on the stored settings, such as initiating an emergency call over a packet-switched connection if the feature is indicated as being present.

If the received message is not an integrity protection message (i.e., the message is a RAU accept message), processing proceeds to decision block 816, where the system determines whether the RAU accept message includes the network feature support IE. If the received message includes the network feature support IE, processing proceeds to block 818, where the mobile device rejects the received message based on its failure to use integrity protection. Processing then proceeds to block 820, where the system uses the previously received settings for network feature support. Similarly, if the RAU accept message does not include a network feature support IE, processing proceeds to block 822, where the mobile device uses the previously received settings for network feature support. After the mobile device has determined the correct settings for network feature support, the process 800 ends.

Figure 8B:
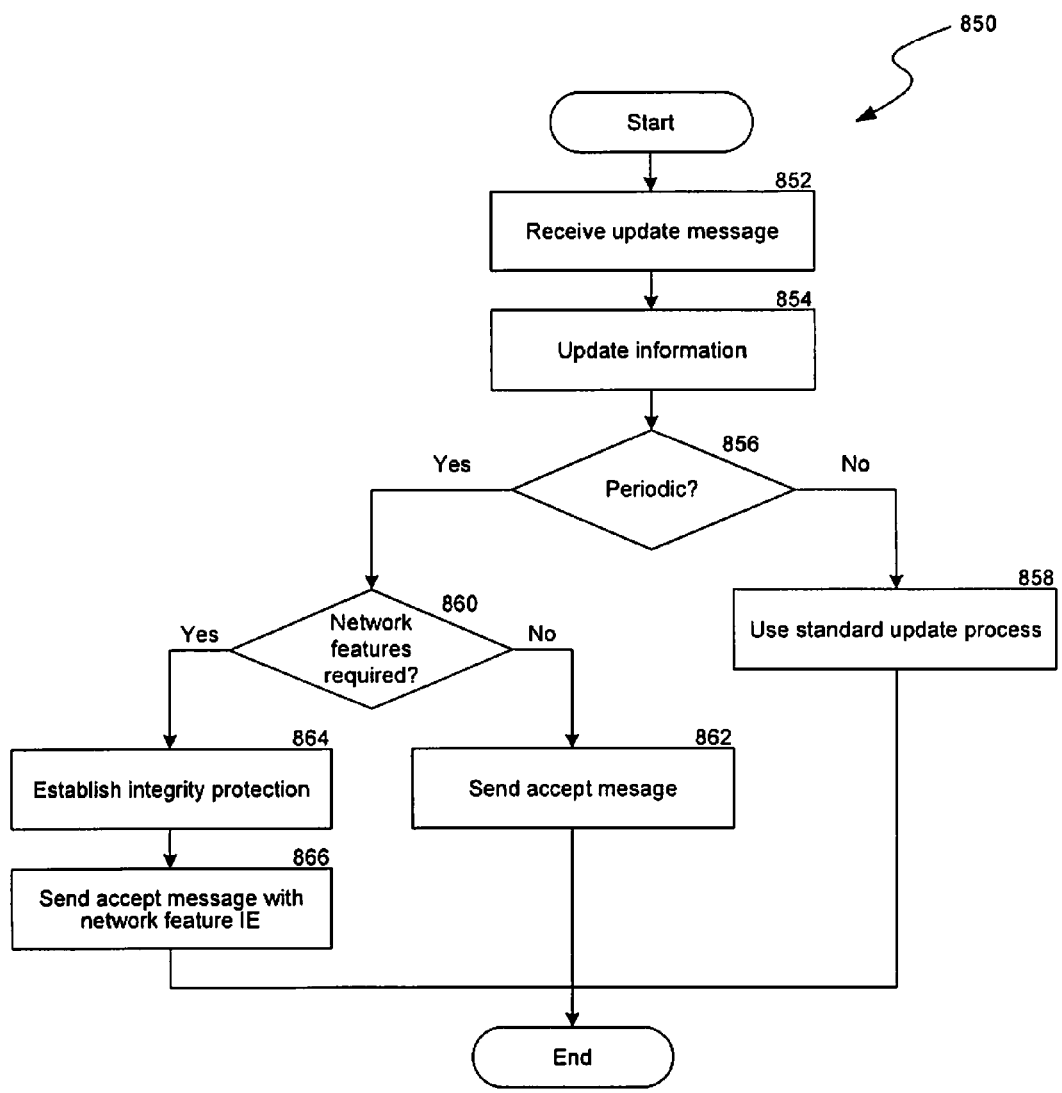
FIG. 8B is a flowchart of a process for executing the second embodiment of the feature support system by the network.

FIG. 8B is a flowchart of a process 850 for executing the second embodiment of the feature support system by the network. Processing begins at block 852, where the network receives the RAU request message. Processing then proceeds to block 854, where the network updates its stored information for the mobile device based on the received message. The processing for these two steps is substantially identical to the processing of blocks 752 and 754 of FIG. 7B above.

Processing then proceeds to decision block 856, where the network determines whether the RAU request message corresponds to a periodic RAU. If the network determines that the RAU request does not correspond to a periodic update, processing proceeds to block 858, where the system uses the standard RAU process to handle the received message.

If the request corresponds to a periodic update, processing proceeds to decision block 860, where the network determines whether it is required to transmit the network feature support IE in response. In general, the network is required to transmit the network feature support IE if is supports any of the features included in the IE. If the network determines that it is not required to send the network feature support IE, processing proceeds to block 862, where the network sends a RAU accept message without including the network feature support IE.

If the network is required to send the network feature support IE, processing proceeds to block 864, where the network establishes integrity protection for the network feature support IE. As discussed above, some or all steps in establishing integrity protection may be performed prior to the RAU, such as during the initial attach process. Processing then proceeds to block 866, where the network sends the RAU accept message with the network feature support IE. The accept message is sent using the integrity protection established previously in block 864. Once the network has sent the RAU accept message, the process 850 ends From the foregoing, it will be appreciated that specific examples of the invention have been described herein for purposes of illustration, but that various modifications may be made without deviating from the spirit and scope of the invention. Accordingly, the invention is not limited except as by the appended claims.

I claim:

1. A method for communicating network features during a routing area update procedure, the method comprising:
    transmitting a routing area update request message to a cellular network,
        wherein the routing area update message is a periodic message generated based at least in part on an elapsed time following a previous routing area update, and
        wherein the routing area update message includes information relating to a location of a mobile device for receiving communications from the cellular network; and
    receiving a routing area update accept message from the cellular network in response to the routing area update request message,
        wherein the routing area update accept message omits a network feature support information element specifying one or more features associated with the cellular network, and
        wherein the routing area update accept message is generated by a network component configured to omit the network feature support information element in response to determining that the routing area update message is a periodic message.

2. The method of claim 1, further comprising:
    in response to receiving the routing area update accept message that omits the network feature support information element, determining network features supported by the cellular network using information based on a previously received network feature support information element.

3. The method of claim 2, wherein the previously received network feature support information element was received in an integrity-protected message.

4. The method of claim 1, wherein the network feature support information element includes data indicating whether the cellular network supports at least one of voice over packet-switched connections or emergency calls over packet-switched connections.

5. The method of claim 1, wherein the routing area update accept message includes a settings information element that includes information specifying a mobile device identifier or one or more timer values.

6. A non-transitory computer-readable storage medium storing instructions for communicating network features during a routing area update procedure, by a method comprising:
    transmitting a routing area update request message to a cellular network,
        wherein the routing area update message is a periodic message generated based at least in part on an elapsed time following a previous routing area update, and
        wherein the routing area update message includes information relating to a location of a mobile device for receiving communications from the cellular network; and
    receiving a routing area update accept message from the cellular network in response to the routing area update request message,
        wherein the routing area update accept message omits a network feature support information element specifying one or more features associated with the cellular network, and
        wherein the routing area update accept message is generated by a network component configured to omit the network feature support information element in response to determining that the routing area update message is a periodic message.

7. The non-transitory computer-readable storage medium of claim 6, further comprising:
    in response to receiving the routing area update accept message that omits the network feature support information element, determining network features supported by the cellular network using information based on a previously received network feature support information element.

8. The non-transitory computer-readable storage medium of claim 7, wherein the previously received network feature support information element was received in an integrity-protected message.

9. The non-transitory computer-readable storage medium of claim 6, wherein the network feature support information element includes data indicating whether the cellular network supports at least one of voice over packet-switched connections or emergency calls over packet-switched connections.

10. The non-transitory computer-readable storage medium of claim 6, wherein the routing area update accept message includes a settings information element that includes information specifying a mobile device identifier or one or more timer values.

11. A method for communicating network features during a routing area update procedure, the method comprising:
    receiving a routing area update request message from a mobile device,
        wherein the routing area update message is a periodic message generated based at least in part on an elapsed time following a previous routing area update, and
        wherein the routing area update message includes information relating to a location of a mobile device for receiving communications from the cellular network; and
    transmitting a routing area update accept message to the mobile device in response to the routing area update request message, wherein the routing area update accept message omits a network feature support information element specifying one or more features associated with the cellular network, and wherein the routing area update accept message is generated by a network component configured to omit the network feature support information element in response to determining that the routing area update message is a periodic message.

12. The method of claim 11, wherein the mobile device is configured to determine network features supported by the cellular network using information based on a previously received network feature support information element in response to receiving the routing area update accept message that omits the network feature support information element.

13. The method of claim 12, wherein the previously received network feature support information element was received in an integrity-protected message.

14. The method of claim 11, wherein the network feature support information element includes data indicating whether the cellular network supports at least one of voice over packet-switched connections or emergency calls over packet-switched connections.

15. The method of claim 11, wherein the routing area update accept message includes a settings information element that includes information specifying a mobile device identifier or one or more timer values.

* * * * *